United States Patent [19]

Task et al.

[11] Patent Number: 4,465,347
[45] Date of Patent: Aug. 14, 1984

[54] HELMET MOUNTED TELESCOPE

[75] Inventors: Harry L. Task; Charles Bates, Jr., both of Dayton, Ohio

[73] Assignee: The United States of America as represented by the Secretary of the Air Force, Washington, D.C.

[21] Appl. No.: 441,814

[22] Filed: Nov. 15, 1982

[51] Int. Cl.³ .................. G02B 23/04; G02B 27/10
[52] U.S. Cl. .................................. 350/538; 350/174; 350/547; 350/558
[58] Field of Search ............... 350/538, 174, 547, 548, 350/558, 298, 291, 294, 301, 302, 540, 541

[56] References Cited

U.S. PATENT DOCUMENTS

| 3,748,016 | 7/1973 | Rossire | 350/96 B |
| 3,833,300 | 9/1974 | Rymes | 350/96.27 |
| 3,923,370 | 12/1975 | Mostrom | 350/55 |
| 4,269,476 | 5/1981 | Gauthier et al. | 350/174 |

Primary Examiner—Jon W. Henry
Attorney, Agent, or Firm—Donald J. Singer; Bobby D. Scearce

[57] ABSTRACT

An improved helmet is provided including means to telescopically acquire an image of a field of view, which comprises, a telescopic optical system including an objective lens mounted to said helmet above the line of sight of the wearer, a light-conducting fiber optics bundle mounted to said helmet for receiving the image from the objective lens, and collimating lens for receiving the image from the fiber optics bundle and projecting the image onto a helmet-mounted visor in the line of sight of the wearer. A shutter, remotely controllable by the wearer, may be disposed intermediate the objective lens and display to selectively block transmission of the image.

4 Claims, 3 Drawing Figures

//4,465,347//

HELMET MOUNTED TELESCOPE

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of helmet-mounted visual display systems and more particularly to a novel helmet-mounted telescope incorporating a fiber optics light conducting means to display a magnified image of an acquired field of view to the wearer of the helmet.

In the operation of modern, high performance aircraft, the pilot is required to maintain control over numerous systems of the aircraft and to continuously visually acquire substantial amounts of information from those systems in order to operate his aircraft efficiently. A fighter pilot in a combat situation additionally must divide his attention between visual acquisition and identification of mission targets and the visual facets of normal aircraft control. It is therefore highly desirable that the pilot be able to visually identify a target, or otherwise maintain an external field of view, telescopically, with minimum changes of his line of sight.

The present invention provides an improved helmet, having particular utility to an aircraft pilot, which includes a helmet mounted telescope for improved visual target identification capability of the wearer/pilot. A small telescope objective lens, mounted on the helmet, produces a magnified image of the acquired field of view, which image is transmitted via a fiber optics link and is displayed on a helmet-mounted visor in the line of sight of the wearer/pilot.

It is, therefore, an object of the present invention to provide an improved helmet, having particular utility by aircraft pilots.

It is a further object of the invention to provide an improved helmet including a telescope and related optics to display a magnified image of an acquired field of view to the wearer.

It is a further object of the invention to provide a helmet including totally self-contained means for providing a pilot with "hands-off" telescopic vision capability.

These and other objects of the present invention will become apparent as the detailed description of certain representative embodiments thereof proceeds.

SUMMARY OF THE INVENTION

In accordance with the foregoing principles and objects of the present invention, an improved helmet is provided including means to telescopically acquire an image of a field of view, which comprises a telescopic optical system including an objective lens mounted to said helmet above the line of sight of the wearer, a light-conducting fiber optics bundle mounted to said helmet for receiving the image from the objective lens, and collimating lens for receiving the image from the fiber optics bundle and projecting the image onto a helmet-mounted visor in the line of sight of the wearer. A shutter, remotely controllable by the wearer, may be disposed intermediate the objective lens and display to selectively block transmission of the image.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
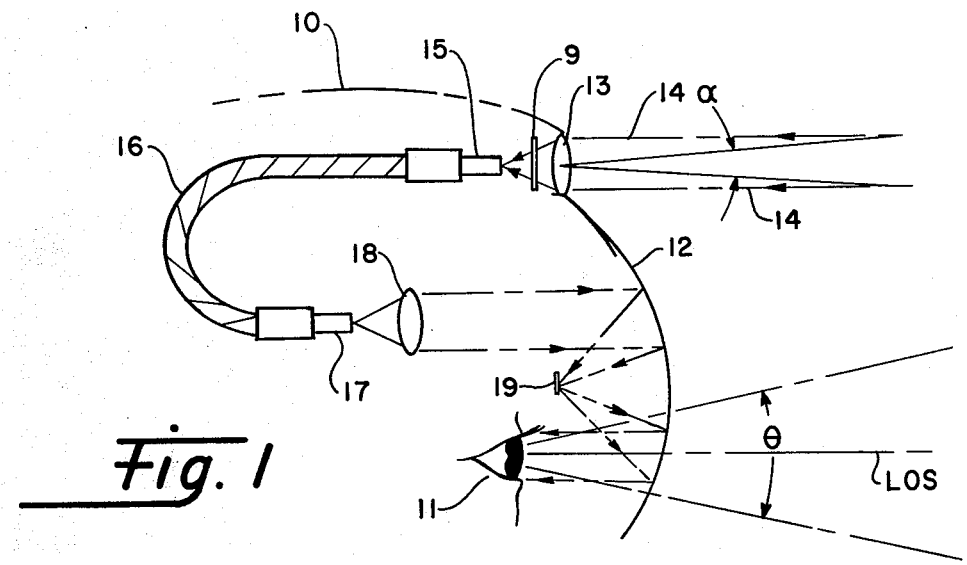
FIG. 1 is a partial schematic side view of a helmet having mounted thereon the novel telescopic optical display system representative of the present invention.

Referring now to FIG. 1, shown therein is a schematic representation of a helmet 10 of the present invention including the novel telescopic optical system and a helmet-mounted parabolic visor display. As shown therein, helmet 10 worn by wearer/observer 11 includes a parabolic visor 12. A telescopic objective lens 13 is mounted to helmet 10 near the top thereof, substantially as shown, for acquiring an image represented by light rays 14 over an angular field of view represented by $\alpha$. The acquired image is projected upon a first end 15 of a light-conducting coherent fiber optics bundle or link 16, transmitted therethrough to the second end 17 thereof where the image is projected upon a collimating optical system represented by collimating lens 18 in FIG. 1. The transmitted image is then projected by collimating lens 18 onto the inner surface of parabolic visor 12, and re-imaged by visor 12 to central reflecting mirror 19. The image is then reflected by mirror 19 back to the visor 12 which acts as an eyepiece to produce a virtual image in the line of sight (LOS) of wearer 11. That (upper) portion of visor 12 upon which the image is projected by collimating lens 18 may be configured to support a substantially reflective surface in order to enhance the projected image, whereas the lower part of visor 12 through which the line of sight of wearer 11 passes may be made partially reflective in order to project the acquired telescopic image into the usual line of sight of wearer 11. Wearer 11 has a field of view which may be represented by $\theta$ and, therefore, the magnification m of the acquired image displayed on the inner surface of visor 12 may be represented by $m = \theta/\alpha$. The focal length of objective lens 13 may be chosen to have an angular field of view $\alpha$ which may be 4 to 5 times less than the apparent angular field of view $\theta$ of wearer 11 which results in a magnification factor for the projected image of about 4 to 5.

A shutter 9 may be provided at any desirable location along the path of transmission of the image in order to selectively block the transmitted image. The configuration of FIG. 1 shows the shutter 9 positioned adjacent one end 15 of fiber optics link 16, although positioning shutter 9 adjacent end 17 may be equally desirable, the precise location being a matter of choice and not considered a limitation of the invention herein. Shutter 9 may be configured to be remotely controllable through conventional means (not shown) to allow wearer/observer 11 to selectively open or close shutter 9. Therefore, with the shutter 9 closed, no image will be displayed on visor 12 and wearer 11 will have an unhindered normal view along his line-of-sight (LOS). With shutter 9 open, the image transmitted through the optical system of the present invention will be superimposed on visor 12 in the normal line of sight of wearer 11.

Figure 2:
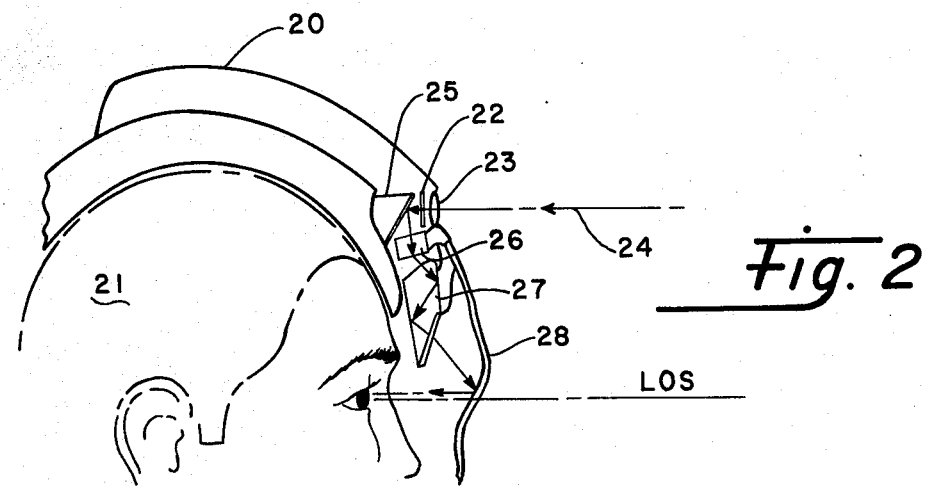
FIG. 2 is an alternate configuration for mounting a telescopic objective lens and associated optics according to the present invention.

Alternatively, as illustrated in the embodiment of FIG. 2, a helmet 20 configured to be worn by a wearer 21 may include a telescopic objective lens 23 mounted substantially as shown in order to acquire an image represented by light rays 24. A shutter 22 may be included adjacent lens 23. The acquired image is reflected by a mirror 25 and through a fiber optics rotator 26 and prism 27 and displayed to wearer 21 on the inner surface of spherical visor 28. A virtual image of the acquired view is displayed in the line of sight (LOS) of wearer 21 in manner similar to that of the FIG. 1 embodiment, and has a magnification factor characteristic of the focal length of lens 23 and apparent angular field of view of wearer 21.

Figure 3:
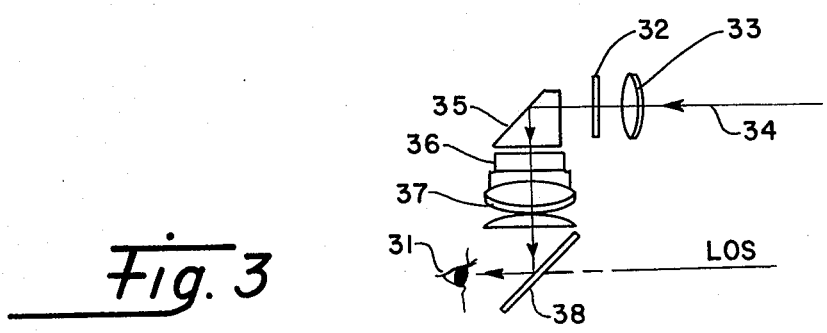
FIG. 3 presents a schematic representation of an alternative configuration for mounting the optics of this invention.

A schematic representation of another embodiment of an optical system which may be helmet mounted according to the present invention is shown in FIG. 3. As shown therein, telescopic objective lens 33 acquires an image of its field of view represented by light rays 34. A shutter 32 may be mounted adjacent lens 33. The image is then transmitted through folding prism 35, fiber optics rotator 36 and magnifier lens 37 for display on visor 38 in the line of sight of wearer 31.

The invention herein therefore provides an improved helmet including means to telescopically acquire an image and display the same at a desired magnification onto the line of sight of the wearer. It is understood that certain modifications to the invention as herein described may be made, as might occur to one with skill in the field of this invention, within the scope of the appended claims. Therefore, all such arrangements of optical components contemplated hereunder which achieve the objects of the present invention have not been shown in complete detail. Other embodiments may be developed without departing from the spirit of this invention or from the scope of the appended claims.

We claim:

1. An improved helmet including means for visually acquiring an image of a field of view and displaying a magnification of said image to the wearer, comprising:
   a. a telescopic objective lens mounted to said helmet near the top thereof for forming and transmitting a magnified image of said acquired field of view;
   b. a reflective visor mounted to said helmet in the line of sight of said wearer;
   c. a fiber optics link having a first end thereof mounted to said helmet near said objective lens for receiving said image transmitted by said objective lens; and
   d. a collimating lens mounted to said helmet near the second end of said fiber optics link for displaying the image transmitted through said link onto said visor.

2. The helmet as recited in claim 1 further comprising a shutter for selectively blocking transmission of said image.

3. The helmet as recited in claim 1 wherein said visor has a substantially reflective upper portion, and a partially reflective lower portion in the line of sight of said wearer.

4. The helmet as recited in claim 3,
   a. wherein said collimating lens is optically aligned to display said image on said upper portion of said visor, and
   b. further comprising a central mirror for reflecting said displayed image onto said lower portion of said visor in the line of sight of said wearer.

* * * * *